United States Patent
Di Federico et al.

(10) Patent No.: US 11,809,191 B2
(45) Date of Patent: Nov. 7, 2023

(54) MANEUVERING SYSTEM FOR AUTONOMOUS WHEELED ROBOT FOR OPTIMALLY REACHING STARTING POINT

(71) Applicant: LIMITED LIABILITY COMPANY "TOPCON POSITIONING SYSTEMS", Moscow (RU)

(72) Inventors: Ivan Giovanni Di Federico, Argenta (IT); Alexey Anatolievich Generalov, Moscow (RU); Lev Borisovich Rapoport, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 366 days.

(21) Appl. No.: 17/284,516

(22) PCT Filed: Sep. 29, 2020

(86) PCT No.: PCT/RU2020/000504
§ 371 (c)(1),
(2) Date: Apr. 12, 2021

(87) PCT Pub. No.: WO2022/071822
PCT Pub. Date: Apr. 7, 2022

(65) Prior Publication Data
US 2022/0308588 A1   Sep. 29, 2022

(51) Int. Cl.
*G05D 1/00* (2006.01)
*G05D 1/02* (2020.01)

(52) U.S. Cl.
CPC ......... *G05D 1/0214* (2013.01); *G05D 1/0238* (2013.01); *G05D 1/0257* (2013.01); *G05D 1/0278* (2013.01)

(58) Field of Classification Search
CPC .. G05D 1/0238; G05D 1/0257; G05D 1/0278; G05D 2201/0201; G05D 1/0219
See application file for complete search history.

(56) References Cited

U.S. PATENT DOCUMENTS

| 8,224,525 B1 | 7/2012 | Rapoport et al. |
| 2017/0014470 A1 | 5/2017 | Dang et al. |
| (Continued) | | |

FOREIGN PATENT DOCUMENTS

CN   103713295 A   4/2014

OTHER PUBLICATIONS

Rapoport L.B.: Estimation of Attraction Domains in Wheeled Robot Control. Automation and Remote Control. 67. (9), 1416-1435 (2006). DOI: 10.1134/S0005117906090062 (Year: 2006).*

(Continued)

*Primary Examiner* — Anne Marie Antonucci
*Assistant Examiner* — Jordan T Smith
(74) *Attorney, Agent, or Firm* — Bardmesser Law Group

(57) ABSTRACT

System for navigating to a trajectory starting point by autonomous robot includes a GNSS navigation receiver including antenna, analog front end, plurality of channels, and a processor, generating navigation and orientation data for the robot; based on the navigation and the orientation data, the system calculating a position and a direction of movement for the robot towards the starting point of the trajectory, given known physical constraints for movement of the robot; the system calculating spatial and orientation coordinates $z_1$, $z_2$ of the robot, which relate to the position and the direction of movement, where $z_1$ represents lateral deviation, and $z_2$ represents angular deviation; the system continuing with a programmed path for the robot for any spatial and orientation coordinates $z_1$, $z_2$ within an attraction domain; and for any spatial and orientation coordinates of the robot outside the attraction domain, the system continues maneuvering until the robot is inside the attraction domain.

16 Claims, 7 Drawing Sheets

(56) References Cited

U.S. PATENT DOCUMENTS

| | | | |
|---|---|---|---|
| 2017/0034216 A1 | 5/2017 | Santhiveeran et al. | |
| 2017/0144702 A1* | 5/2017 | Dang | B62D 6/001 |
| 2017/0339821 A1* | 11/2017 | Ray | G05D 1/0219 |
| 2017/0035726 A1 | 12/2017 | Foster et al. | |
| 2017/0357267 A1* | 12/2017 | Foster | G05D 1/024 |
| 2019/0317516 A1* | 10/2019 | Zhu | B60W 60/001 |

OTHER PUBLICATIONS

L. B. Rapoport, "Estimation of an attraction domain for nonlinear multivariable control systems," 1999 European Control Conference (ECC), Karlsruhe, Germany, 1999, pp. 1249-1252, doi: 10.23919/ECC.1999.7099481. (Year: 1999).*

C. Tarin, H. Brugger, E. P. Hofer and B. Tibken, "Combining trajectory control and position control for autonomous mobile robot navigation," 2001 European Control Conference (ECC), Porto, Portugal, 2001, pp. 1804-1809, doi: 10.23919/ECC.2001.7076183. (Year: 2001).*

L. B. Rapoport, "Periodic solution of the selector-linear differential inclusion and estimation of invariant regions in the wheeled robot control problem," 2010 IEEE 26-th Convention of Electrical and Electronics Engineers in Israel, Eilat, Israel, 2010, pp. 55-59, doi: 10.1109/EEEI.2010.5661948. (Year: 2010).*

Search Report in PCT/RU2020/000504, dated Feb. 11, 2021.

* cited by examiner

MANEUVERING SYSTEM FOR AUTONOMOUS WHEELED ROBOT FOR OPTIMALLY REACHING STARTING POINT

BACKGROUND OF THE INVENTION

The present invention relates to autonomous robotic systems, and, more particularly, to robust robot behavior. The invention also relates to online construction of such a path that ensures the robot's trajectory connects to a beginning of an earlier-constructed path.

DESCRIPTION OF THE RELATED ART

The use of autonomous wheeled robots in precision agriculture has become widespread. The normal operation of these robots is to safely track the predetermined target path, usually consisting of parallel swaths covering the area to be processed. At the same time, constantly occurring disturbances put the robot out of stable motion. The onboard control system of the wheeled robot must be able to diagnose the situation of loss of stability in order to allow the control system to enter an additional safe backup or standby mode.

While being in the backup mode, the robot must be able to find the way back into vicinity of the target path. High precision of tracking is not expected for a robot operating in the backup mode. This mode is not considered as a mode of steady state tracking that would guarantee long time of stable and precise operation. Instead, it is considered as a search mode during which the robot's target point finds the way back to the target path. Once the robot gets close enough, the control system switches back to the normal operation.

Another situation when the robot is in a search mode happens every time at the very beginning of the autonomous operation. After the robot is delivered to the field, turned on and left alone to begin the autonomous operation, the control system must get initialized. As a part of initialization, it must check that the robot is close enough to the desired path and have proper orientation relative to the path. Otherwise, it must find the way to the beginning of the path to let the auto-steering algorithm to get into the closed loop mode.

Independently of whether the control system is in the search mode or in the closed loop mode, additional geometric constraints can be applied. All maneuvers performed during searching the way may be constrained by necessity to stick to areas allowed for operation.

To decide if the vicinity of the target path is reached, specially designed methods of estimation of attraction domains are used. Description and construction of the attraction domains is described in commonly owned PCT/RU2020/000441, filed on Aug. 19, 2020, incorporated herein by reference in its entirety. The use of attraction domains in automatic control systems of wheeled robots is explained in [1] and partially in [2] as assistance to the operator. The autonomous mobile robots (AMRs) operation excludes the presence of operators at all in all potential area, such as small wheeled robots for precise agriculture, golf course lawn mowers, and so on. The common challenge for these areas is to make the robot behavior reliable and fully predictable, including safe and secure operation [3].

Thus, once the AMR gets into the attraction domain, its behavior becomes predictable. It will operate safely and predictable. Therefore, the following question arises: how can the AMR be brought inside the attraction domain? The onboard navigation system can only decide if the AMR belongs to it. Therefore, there is a need for a dedicated system or algorithm which guarantees getting into the attraction domain for predictable autonomous operation—whether at start of operation, or whether because the robot, for whatever reason, has left the attraction domain.

SUMMARY OF THE INVENTION

Accordingly, a system for navigating to a trajectory starting point by an autonomous robot includes a GNSS navigation receiver including an antenna or multiple antennas, an analog front end, a plurality of channels, and a processor, all generating navigation and orientation data for the robot; based on the navigation and the orientation data, the system calculating a position and a direction of movement for the robot towards the starting point of the trajectory, given known physical constraints for movement of the robot; the system calculating spatial and orientation coordinates $z_1$, $z_2$ of the robot, which relate to the position and the direction of movement, where $z_1$ represents lateral deviation, and $z_2$ represents angular deviation; the system continuing with a programmed path for the robot for any spatial and orientation coordinates $z_1$, $z_2$ within an attraction domain; and for any spatial and orientation coordinates of the robot outside the attraction domain, the system continues maneuvering until the robot is inside the attraction domain.

Optionally, a measure $V(z)$ of distance from zero in a $z_1$, $z_2$ plane is defined by $$V(z) = z^T P z + \theta \int_0^{c^T z} \Phi(z_2, \sigma) d\sigma,$$

where P is a 2 by 2 matrix
$z^T$ is $(z_1, z_2)^T$, T stands for transposition,
$\theta$ is a scalar coefficient,
$\Phi$ is a control function defined by $$\Phi(z_2, \sigma) = s_{\overline{u}}\left(\frac{\sigma}{(1+z_2^2)^{\frac{3}{2}}}\right)(1+z_2^2)^{\frac{3}{2}},$$

$$s_{\overline{u}}(u) = \begin{cases} -\overline{u} & \text{for } u \leq -\overline{u}, \\ u & \text{for } |u| < \overline{u}, \\ \overline{u} & \text{for } u \geq \overline{u}, \end{cases}$$

$$\sigma = \lambda^2 z_1 + 2\lambda z_2,$$

$\lambda$ is a desired rate of exponential decrease of lateral displacement.

Optionally, the maneuvering includes course reversal, and/or a K-turn, and/or posture stabilization algorithms, and/or using radar or lidar for navigation around the physical constraints. Optionally, the spatial and orientation coordinates $z_1$, $z_2$ of the attraction domain are defined by a Lurie-Postnikov function.

Additional features and advantages of the invention will be set forth in the description that follows, and in part will be apparent from the description, or may be learned by practice of the invention. The advantages of the invention will be realized and attained by the structure particularly pointed out in the written description and claims hereof.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
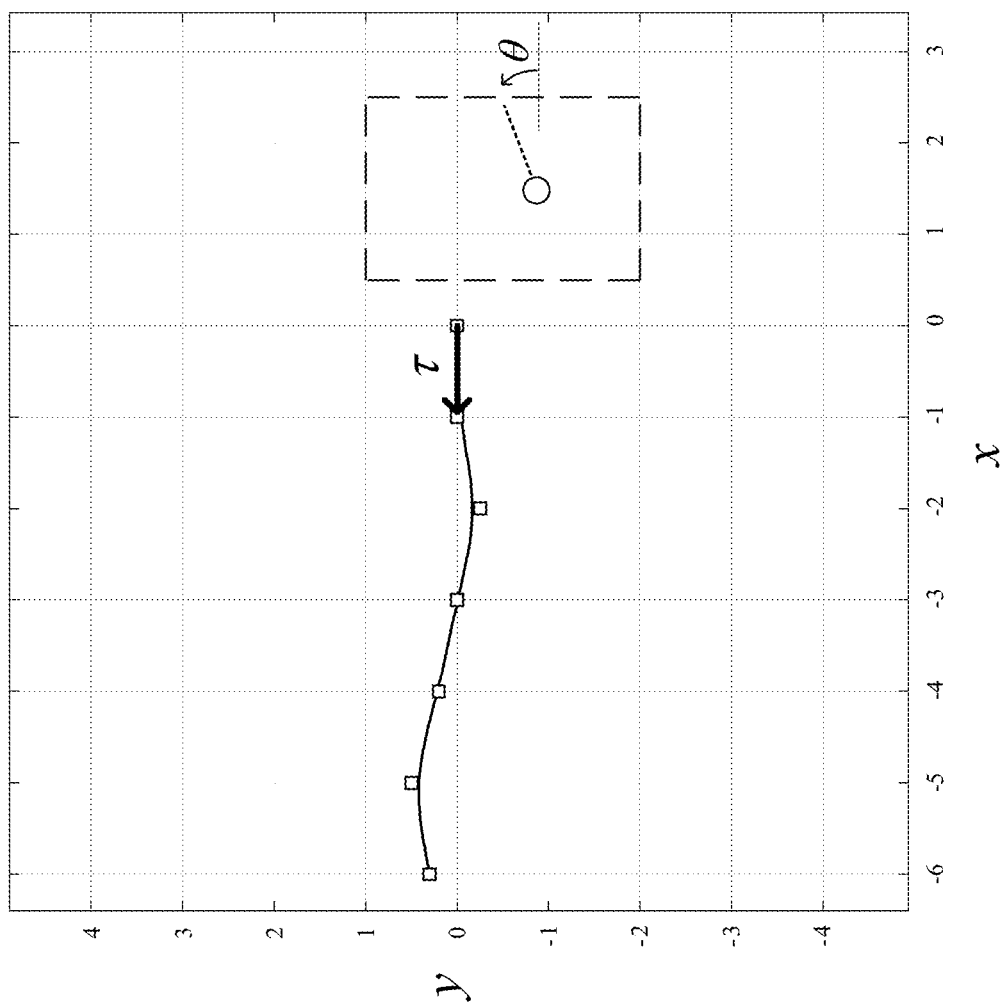
FIG. 1 illustrates the target path, the area, allowed for operation and initial position and orientation of the robot.

Reference will now be made in detail to the preferred embodiments of the present invention.

The objective of the autonomous control is to bring the target point of the robot to the vicinity of the target path and stabilize the motion of the target point along the target path. For predictable autonomous operation, the robot's state must belong to the specially estimated attraction domain. The attraction domain is supposed to be estimated prior to operation and to be invariant. Invariance is such a property, that the trajectory of the robot, once getting inside the attraction domain, will no longer leave it. This is necessary for the mode of steady state tracking, which would guarantee long term stable and precise operation. Thus, the starting maneuver (search mode operation) is needed to guarantee getting into the attraction domain.

The idea of the starting maneuver is to reduce the distance from the target point of the robot to the starting point of the target path (lateral deviation) and adjust the robot's orientation relative to the target path (angular deviation). The algorithm guarantees that the robot's state gets inside the attraction domain prior to start moving along the target path. When entering the target path and then during tracking it, the lateral deviation keeps at a given level of accuracy. The level of accuracy can be adjusted by selection of proper attraction domain estimation subjected to geometric constraints.

The space for maneuvers during the search mode operation may turn out to be limited. For example, geometric constraints can be obtained beforehand by optical sensors, radar or LIDAR. In order to have a proper orientation relative to the target path prior to entering it, turning the robot around may be required. When the area allowed for operation is too narrow, the three-point turn using forward and reverse gears is typical. For that reason, reverse motion is also involved in the starting maneuver and two control loops are used simultaneously—one is for the turning angle of the steering wheels and the second is for the direction of motion (reverse) control.

The control loop for the turning angle of the steering wheels is divided into three stages. In the first stage the robot moves perpendicular to the target path in the direction of reducing the lateral deviation. When the lateral deviation reaches the threshold value, the second stage begins and the front wheels turn to reduce the angular deviation. Conventional feedback linearization method is used to control the turning angle of the steering wheels at the third stage, when the robot's orientation relative to the target path reaches the threshold value.

The control loop for direction of motion (reverse) is used to account for the geometric constraints (area allowed for operation). Here, the idea of "mirror mapping" can be used. When the robot reaches the boundary of allowed area, its direction of motion and the turning angle of the steering wheels change to the opposite. This affects to the control loop for the turning angle of the steering wheels to change direction. The area allowed for operation is supposed to be closed space, bounded from all sides. This allows the robot to move within a closed area from one boundary to another, until it reaches the attraction domain in the vicinity of the target path.

The area allowed for operation is selected to be consistent with the estimation of attraction domain. The boundary closest to the starting point of the target path is apart from it, so that the robot will first pass some distance being inside the attraction domain estimate prior to starting the move along the target path. During this pass, being inside the attraction domain, the system phase coordinates and, in particular, lateral deviation along the trajectories of the system will decrease exponentially at a given rate. Attraction domain estimation is set, subject to geometric constraints, so that the lateral deviation is limited by a given value. This means, that by the time the robot starts moving along the target path, the lateral deviation will decrease to a given value. Setting the given values defines the level of accuracy of tracking the target path from the very beginning of entering it.

The accuracy of tracking the target path may be adjusted also using a nested set of attraction domains. In this case, the starting maneuver will be performed to first enter the wider domain estimation with less tracking accuracy, and then continuously get inside thinner domain estimations with higher level of accuracy.

As an exemplary application, the starting maneuver (search mode operation) algorithm, guaranteeing a wheeled robot getting into the attraction domain is considered. For the given attraction domain estimate, the area allowed for operation is chosen so that after the search mode, a centimeter-level accuracy of tracking the target path is guaranteed. Numerical examples with trajectories of the maneuvers explaining the control loops for achieved lateral deviation are illustrated in figures.

The use of so-called posture stabilization algorithms in automatic control systems of wheeled robots is explained, for example, in [4] and [5] with proven asymptotic stability. However, the disadvantage of these approaches are coefficients in the control loop to be chosen for a given scenario. When the area allowed for maneuvers during the search mode operation is constrained, this make it hard to automatically choose parameters with limitations on boundedness of control resources. Utilizing an algorithm for the autonomous operation excludes the manual coefficients adjustment for each scenario.

An algorithm for finding a path to a neighborhood of a target trajectory with a given accuracy is a subject of the current application. As already discussed above, this neighborhood must belong to the guaranteed attraction domain of the closed loop control system.

Let there be a target curvilinear path (see in FIG. 1) defined as a uniform cubic B-spline in a rectangular Cartesian coordinate system on the x, y plane. FIG. 1 shows an example of a target path as a spline defined by a sequence of control vertices, represented with squares. The starting point of the target path is located at the origin 0,0. The vector tangent to the target path at the starting point is denoted as τ.

Let the position of the robot's target point be set by the coordinates M(1,−1) at the initial time moment, and the orientation angle of the robot platform is θ=10° relative to the x axis (see FIG. 1). The turning angle of the steering wheels of the robot with respect to the robot platform is denoted as α. The scalar linear velocity of the target point is denoted as v. The reverse motion is involved into the starting maneuver and the velocity can have different sign (v>0–forward motion, v<0–reverse). In this example, the initial speed v=0.5 m/s and the minimum possible turning radius of the platform $R_{min}$=2 m is set.

Let us assume that the space allowed for operation during the search mode is constrained by a rectangular area. In FIGS. 1-4, this area is shown as a dashed rectangle, the target point of the robot is shown as a circle, and the vector indicating the orientation of the robot is shown as a dotted line.

The boundaries of area allowed for maneuvering are chosen to correspond to the minimum possible turning radius of the platform $R_{min}$. The coordinates of the left, right, up and down edges of the rectangle are: $x_L$=0.5, $x_R$=max $(x_S+0.5R_{min}, x_L+R_{min})$, $y_U$=0.5$R_{min}$, $y_D$=min $(y_S-0.25R_{min}, y_U-1.5R_{min})$, respectively. Here $x_S$, $y_S$ are the coordinates of the robot at the initial time moment when the robot starts moving. Thus, the distance between the left and right edges is at least $R_{min}$, and the distance between the top and bottom edges is at least $1.5R_{min}$.

Figure 2:
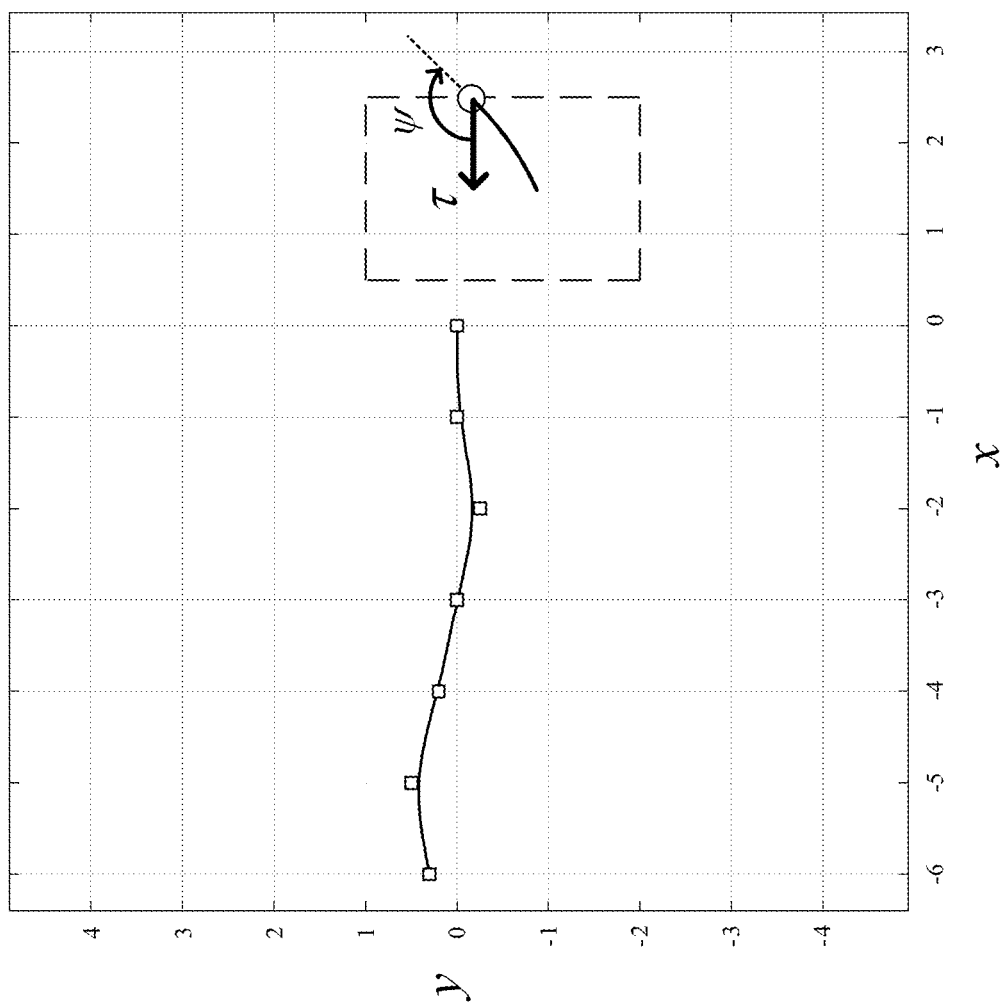
FIG. 2 illustrates the target path, the area, allowed for operation, position and orientation of the robot when it touches the boundary of the allowed area for the first time, and the robot's trajectory.

To describe the control algorithms, the notion of angular deviation ψ and lateral deviation D are used. The angular deviation ψ is the angle between the vector τ (tangent to the target path at the starting point) and the orientation vector of the robot, as shown in FIG. 2. The lateral deviation D is the distance from the target point of the robot to a straight line passing through the starting point of the target path parallel to the vector τ (the vector τ is the guiding vector of the line). Two control loops are used simultaneously—one is for the turning angle of the steering wheels and the second is for the direction of motion (reverse) control.

The control loop for the turning angle of the steering wheels is divided into three stages. In the first stage, if the lateral deviation is large enough (D≥$R_{min}$/2), the robot moves perpendicularly to the τ vector in the direction of reducing the lateral deviation, and the turning angle of the steering wheels is computed as follows:

$$\alpha = s_{\overline{\alpha}}((|\psi| - \pi/2)\operatorname{sgn}(v\theta)), \quad (1)$$

where $$\operatorname{sgn}(v\theta) = \begin{cases} 1 & \text{for } v\theta \geq 0, \\ -1 & \text{for } v\theta < 0, \end{cases} \quad (2)$$

$$s_{\overline{\alpha}}(\alpha) = \begin{cases} -\overline{\alpha} & \text{for } \alpha \leq -\overline{\alpha}, \\ \alpha & \text{for } |\alpha| < \overline{\alpha}, \\ \overline{\alpha} & \text{for } \alpha \geq \overline{\alpha}. \end{cases} \quad (3)$$

In (3), $\overline{\alpha}$ is the maximum turning angle of the steering wheels.

In the second stage, if the lateral deviation is small enough (D<$R_{min}$/2), the front wheels turn to reduce the magnitude of angular deviation |ψ| until it is less than π/2:

$$\alpha = s_{\overline{\alpha}}(-\psi \operatorname{sgn}(v)). \quad (4)$$

When |ψ|<π/2 is met, feedback linearization method is used for the turning angle at the third stage:

$$\alpha = \begin{cases} s_{\overline{\alpha}}\left(\arctan\left(-L\dfrac{2\pi \sin(\psi) + \lambda^2 D}{\cos(\psi)}\right)\right) & \text{for } v \geq 0, \\ s_{\overline{\alpha}}(\psi) & \text{for } v < 0, \end{cases} \quad (5)$$

where λ>0 is desired rate of exponential decrease of the lateral deviation D and L is the distance between front and rear axles.

The control loop for direction of motion (reverse) is used to account for the geometric constraints (area allowed for operation). The idea of "mirror mapping" is used as follows. When the robot reaches the boundary of allowed area (dashed rectangle, FIGS. 1-4), its direction of motion changes to the opposite. This affects the turning angle of the steering wheels to change sign (see (1)-(5)).

Figure 3:
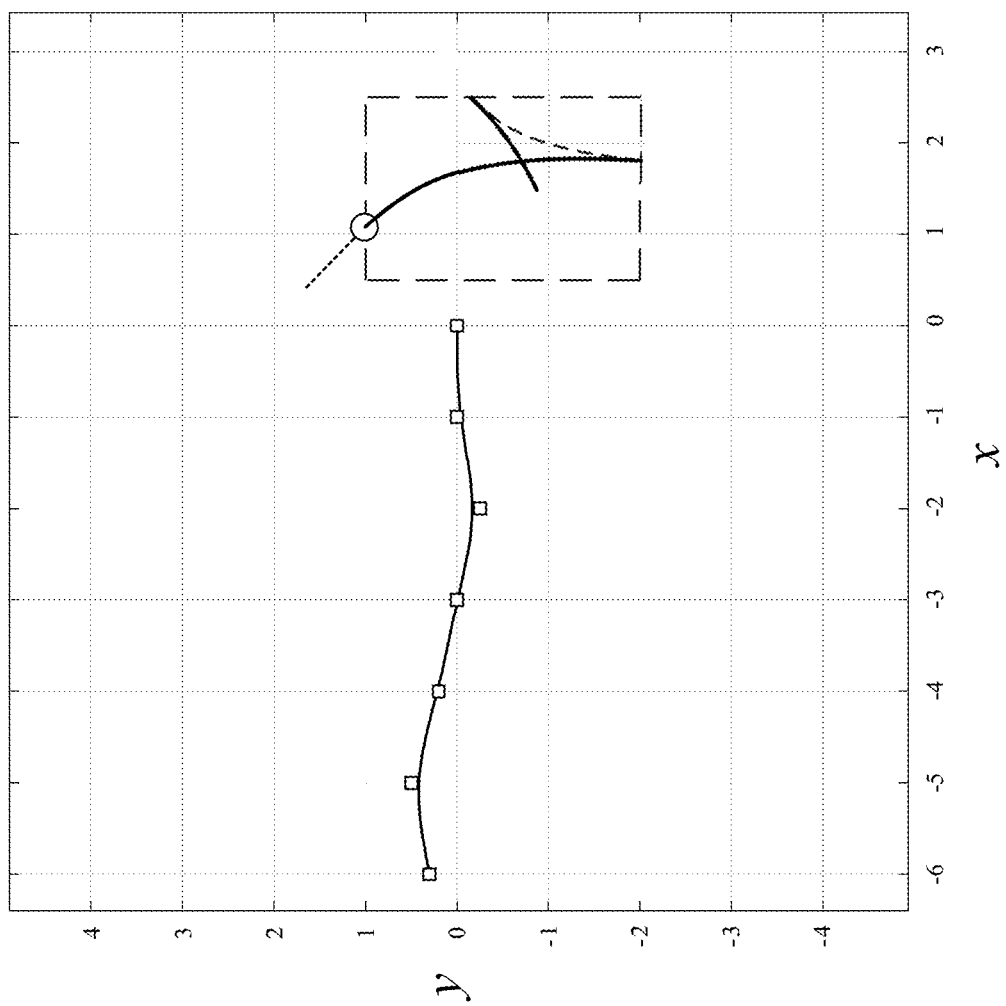
FIG. 3 illustrates the target path, the area allowed for operation, the position and orientation of the robot at an intermediate time, along with the trajectories of the robot.
Figure 4:
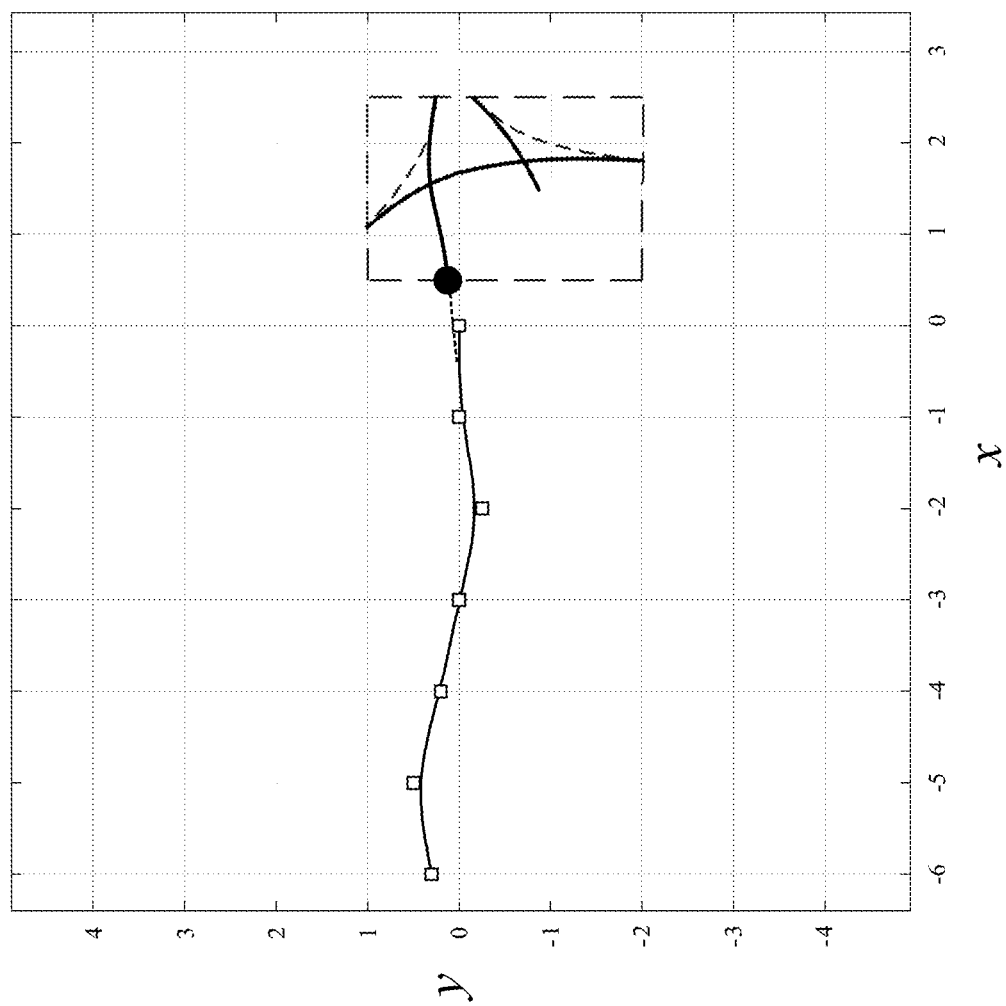
FIG. 4 illustrates the target path, the area, allowed for operation, position and orientation when the robot reaches the attraction domain and finishing the starting maneuver along with the robot's trajectories.

Proposed algorithm allows the robot to move within a closed area from one boundary to another, until it reaches the attraction domain in the vicinity of the target path. FIGS. 2-4 illustrate trajectories of the maneuvers explaining the control loops. FIG. 2 shows the trajectory passed by the robot from the initial time moment to the moment when it first crosses the boundary of area allowed for maneuver. The trajectory shown by solid line indicates that the robot is moving forward. After reaching the boundary of the area allowed for maneuver, the turning angle of the steering wheels changes sign, and the direction of motion changes to the opposite (v=−0.5 m/s) and reverse motion continues. The reverse trajectories are shown by dashed lines (FIGS. 3-4). This continues until the next boundary of constrained area is reached and the direction of motion is changed to the opposite (see FIG. 3). The robot moves from one boundary to another until its state gets inside the attraction domain (FIG. 4). After entering the attraction domain, the starting maneuver (search mode) finishes, and the control system switches back to the closed loop (normal) operation. A light tower (i.e., a set of LEDs or similar, on the robot, that indicates the status and parameters of robot's operation) indicates stable operation. FIG. 4 schematically indicates this fact: the target point is shown as a filled circle.

Figure 5:
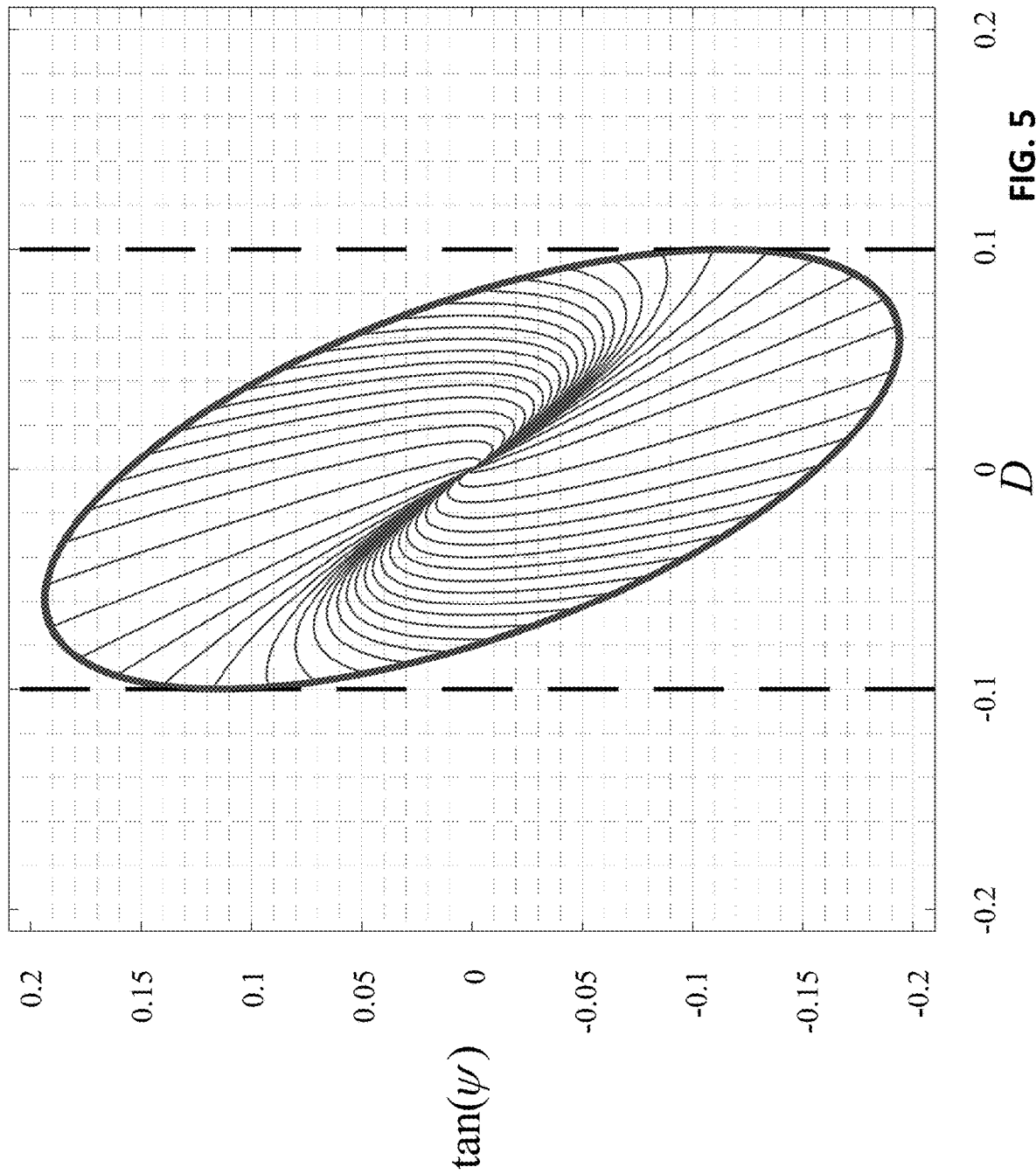
FIG. 5 illustrates the attraction domain subject to the geometric constraints used for the starting maneuver.
Figure 6:
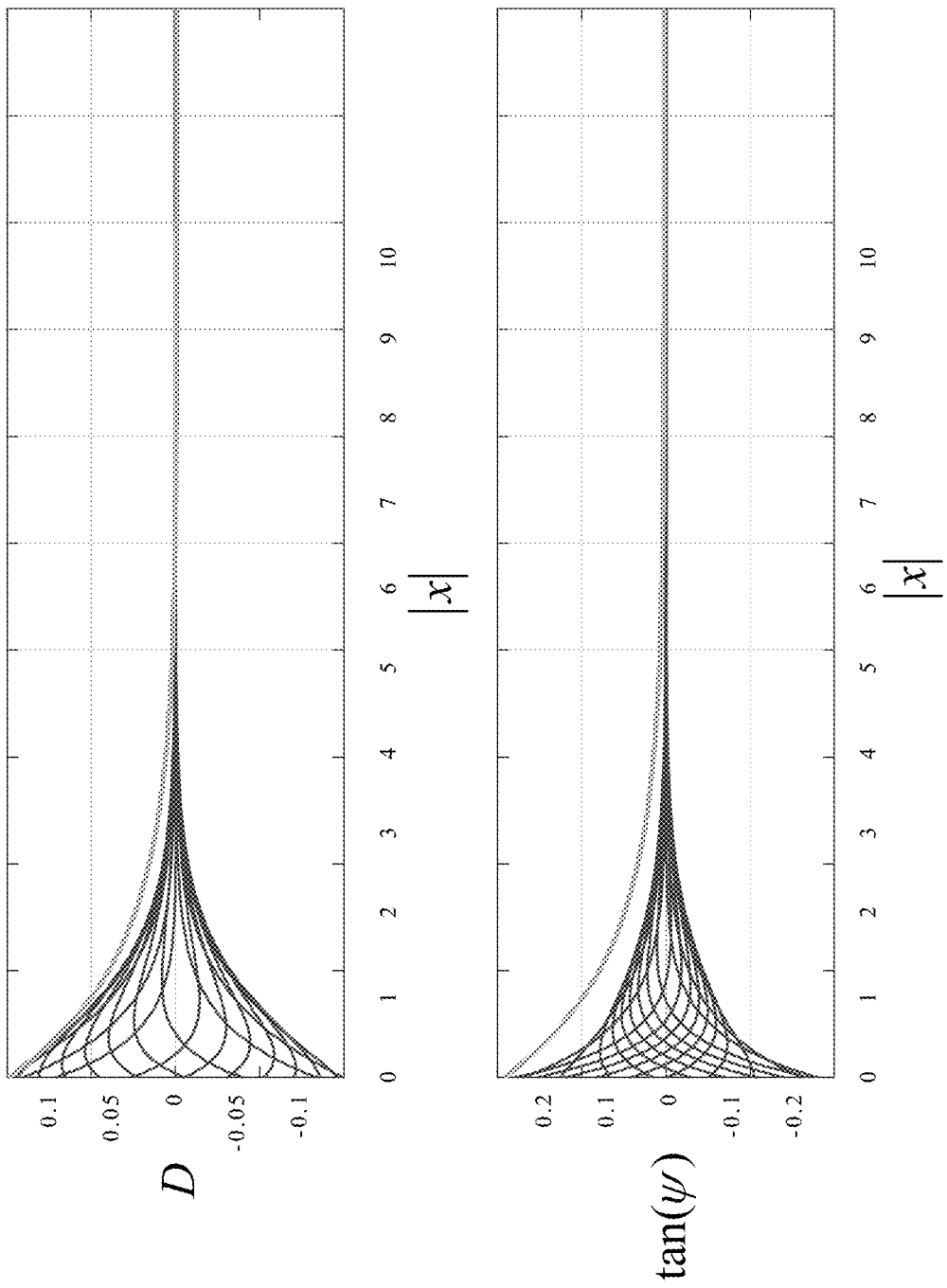
FIG. 6 illustrates exponential decrease of the system phase coordinates along the trajectories of the robot being inside the attraction domain.

The left edge is 0.5 m apart from the beginning of the target path ($x_L$=0.5), so the robot will first pass this distance being inside the attraction domain estimate, until it starts moving along the target path. This choice is consistent with the estimation of attraction domain as follows. Let us obtain an estimate of the attraction domain that guarantees asymptotic stability with a given index of exponential decay μ=0.45λ with λ=2. Let's inscribe the estimate into the band |D|≤0.1 (FIG. 5). Then, once getting inside the attraction domain, the system phase coordinates, and, in particular, the lateral deviation D along the trajectories of the system will decrease exponentially at the rate −μ. Once getting inside the attraction domain with the lateral deviation $|D|\leq 0.1$ m, by the time the robot starts moving along the target path, it will pass a distance of 0.5 m along the x axis, the lateral deviation become $|D|\leq 0.06$ m (FIG. 6) and will continue to decrease exponentially. Thus, the centimeter-level accuracy of tracking the target path is guaranteed from the very beginning of entering it. The level of accuracy can be adjusted by selection of proper geometric constraints which attraction domain estimation subjected to.

Construction of such estimates uses Lyapunov functions from certain parametric classes. Let $z \in R^n$ (n-dimensional Euclidean space) be the system state. Entries of this vector are coordinates, velocities, orientation angles and angular rates. Given the Lyapunov function $V(z)$, the estimate of the attraction domain is constructed as a level set in the form:

$$\Omega(\alpha) = \{z: V(z) \leq \alpha^2\}, \tag{6}$$

provided the time derivative with respect to the system dynamics is negative: $\dot{V}<0$ (see [6]). The constant $\alpha$ controls the size of the attraction domain. The larger the constant, the wider will be the domain. Thus, using a series of constants, a series of attraction domains will be generated. The attraction domain corresponding to the smaller constant will belong to the domain corresponding to the larger constant. Thus, the function $V(z)$ generates series of nested domains, each one is invariant and guarantees attraction to the desired operation mode. The most outer and widest domain corresponds to the largest possible constant. Each constant value can be associated with its own color of indication on the display in the monitoring center or the light tower.

Candidates for use as a Lyapunov function are selected from some parametric class. Thus, the more general is the parametric class of Lyapunov functions, the more freedom of choice exists, and the less conservative is the resulting estimate of the attraction domain. A desire to maximize the volume of the attraction domain leads to the problem of optimal parameters choice. In general, the wider is the attraction domain, the wider is set of states for which the safe behavior is guaranteed. If the current state does not belong to the estimate of the attraction domain, the system identifies itself as being in unsafe condition and therefore, additional actions must be taken to guarantee to get back into attraction domain.

Parameters to be chosen in [1], [2] were entries of the positive definite square matrix. The more general class of Lyapunov functions is proposed, which are supposed to be a quadratic form plus an integral of nonlinearity multiplied by an unknown scalar, which is also a parameter to be chosen. These functions are called Lurie-Postnikov functions [7]. The candidate for the Lyapunov function is taken in the form $$V(z) = z^T P z + \theta \int_0^{c^T z} \Phi(z_2, \sigma) d\sigma. \tag{7}$$

Where P is a 2 by 2 matrix, $\theta$ is a scalar coefficient, $\Phi$ is a control function defined by $$\Phi(z_2, \sigma) = s_{\overline{u}}\left(\frac{\sigma}{(1+z_2^2)^{\frac{3}{2}}}\right)(1+z_2^2)^{\frac{3}{2}}, \tag{8}$$

$$s_{\overline{u}}(u) = \begin{cases} -\overline{u} & \text{for } u \leq -\overline{u}, \\ u & \text{for } |u| < \overline{u}, \\ \overline{u} & \text{for } u \geq \overline{u}, \end{cases} \tag{9}$$

$$\sigma = \lambda^2 z_1 + 2\lambda z_2, \tag{10}$$

and $\lambda$ is a desired rate of exponential decrease of lateral deviation.

The symmetric positively definite 2×2 matrix P and the scalar $\theta$ must be chosen in such a way, that $$\dot{V}(z) < 0 \text{ for all } z \neq 0. \tag{11}$$

Even more strong inequality guarantees exponential stability:

$$\dot{V}(z) + 2\mu V(z) < 0 \tag{12}$$

with exponential rate $-\mu$, $0 < \mu < \lambda$.

Thus, we are looking for attraction domain of the form $$\Omega(\alpha) = \{z: V(z) \leq \alpha^2\}, \tag{13}$$

the constant $\alpha$ must be chosen to maximize the size of the set $\Omega(\alpha)$. Given P and $\theta$ the maximum size will be reached at the maximum possible $\alpha$ for which the condition (12) holds. The function (7) is homogeneous with respect to P and $\theta$. Therefore, we can set $\alpha=1$ and choose unknown parameters P and $\theta$ in such a way that the volume of $\Omega(1)$ will be maximized.

As an example of geometric constraints, we take a rectangular $$\Pi(a_1, a_2) = \{z: |z_1| \leq \alpha_1, |z_2| \leq \alpha_2\}. \tag{14}$$

Parameters P, $\theta$, and probably $\alpha \leq 1$ define the invariant attraction domain $\Omega(\alpha)$ which is stored in the internal memory of the onboard controller. The real state of the robot measured by GNSS and inertial sensors is further recalculated into variables $z_1$, $z_2$ which are further checked for condition $$\begin{pmatrix} z_1 \\ z_2 \end{pmatrix} \in \Omega(\alpha). \tag{15}$$

If (15) holds, then the onboard computer takes decision "status OK" and the robot continues autonomous operation. Otherwise, if the condition (15) fails, the onboard computer decides to take the status "alarm". The system identifies itself as being in unsafe condition and therefore, additional actions must be taken to guarantee to get into attraction domain. For example:

operation must be switched to the search mode operation or backup algorithm.

If the robot is equipped with the light tower allowing multiple color lights, the "status OK" or "status alarm" decision can be further quantified in the following way:

if $(z_1, z_2)^T \in \Omega(\alpha)$ where $\alpha \leq 0.75$ (for example), the status is "OK" and the light on the robot's light tower has the green color, if $(z_1, z_2)^T \in \Omega(\alpha)$ where $0.75 < \alpha \leq 1$, the status is "OK but wide-awake" and the light has the yellow color, if (12) fails, the status is "alarm", the light is red, the message is sent to the central facility and the search mode operation or backup algorithm is on.

As will be appreciated by one of ordinary skill in the art, the various blocks and components of the receiver and robot control logic shown in the figures can be implemented as discrete hardware components, as an ASIC (or multiple ASICs), as an FPGA, as either discrete analog or digital components, and/or as software running on a processor.

Figure 7:
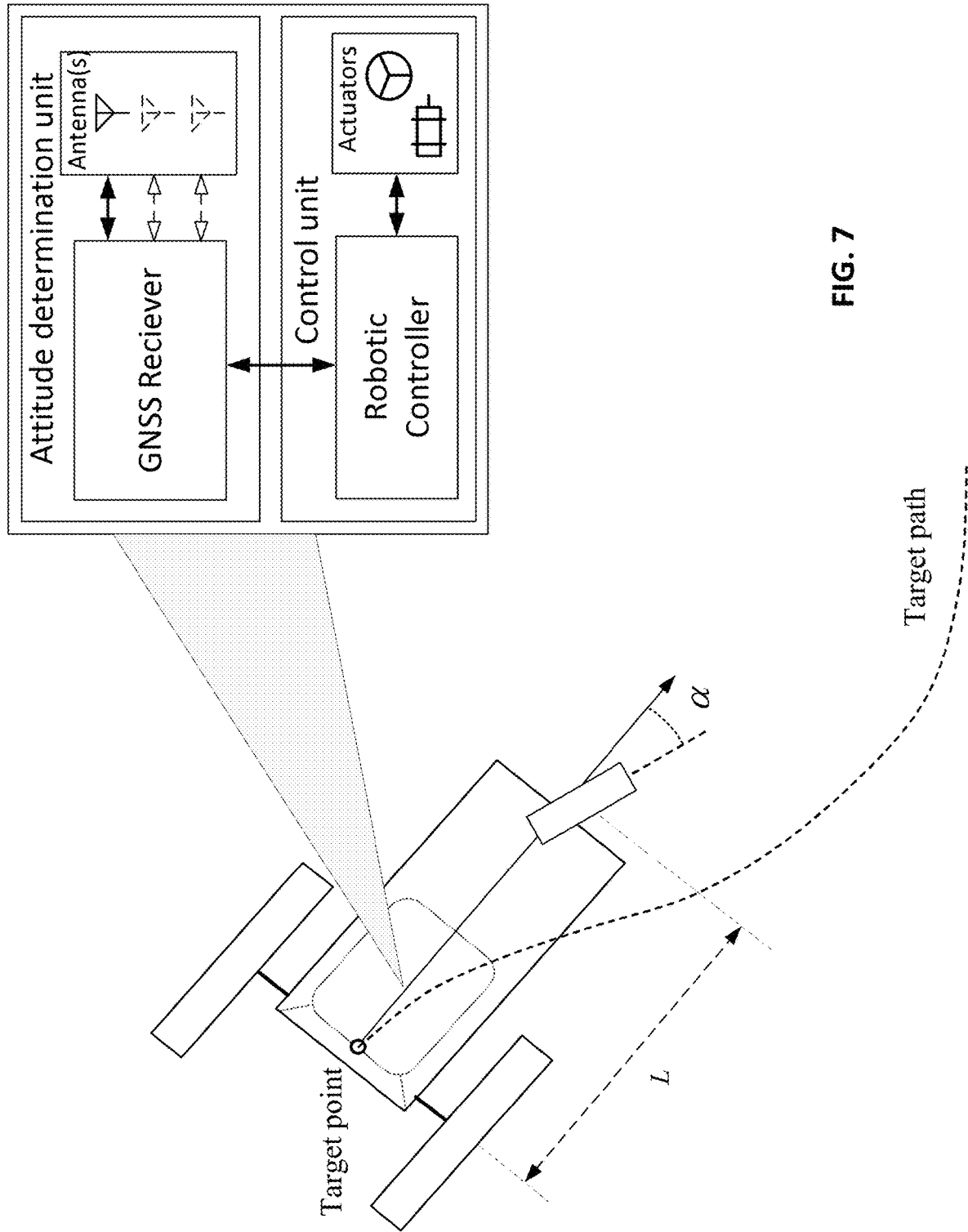
FIG. 7 illustrates hardware aspects of the robot.

FIG. 7 illustrates hardware aspects of the robot. In one embodiment, a control system of an autonomous robot includes an attitude determination unit with GNSS navigation receiver including up to three antennas (optional) all generating navigation and orientation data for the robot; a robotic controller including an inertial measurement unit (IMU) and a processor, calculating a position and a direction of movement for the robot. Based on the navigation and the orientation data, the proposed algorithms are executed at the robotic controller, which then pushes commands to actuators of the robot, which relate to the steering wheels turning and direction of motion control.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

REFERENCES (INCORPORATED HEREIN BY REFERENCE IN THEIR ENTIRETY)

1. Rapoport L. B.: Estimation of Attraction Domains in Wheeled Robot Control. Automation and Remote Control. 67. (9), 1416-1435 (2006). DOI: 10.1134/S0005117906090062
2. U.S. Pat. No. 8,224,525B1 to Rapoport et al., Indication of Attraction Domains for Controlled Planar Motion of a Ground Vehicle. Jul. 17, 2012
3. Cui J. and Sabaliauskaite G. On the alignment of safety and security for autonomous vehicles. In: Proceedings of IARIA CYBER, pp. 59-64. Barcelona (2017), ISBN: 978-1-61208-605-7
4. Morin P., Samson C., *Motion Control of Wheeled Mobile Robots*, In: Siciliano, B., Khatib, O. (eds) Springer Handbook of Robotics. Springer, Berlin, Heidelberg, doi.org/10.1007/978-3-540-30301-5_35 (2008)
5. Maria Thomas, Bijnan Bandyopadhyay, Leena Vachhani, *Posture Stabilization of Unicycle Mobile Robot using Finite Time Control Techniques*, IFAC-PapersOnLine, Volume 49, Issue 1, Pages 379-384, ISSN 2405-8963, doi.org/10.1016/j.ifacol.2016.03.083 (2016).
6. H. Khalil, Nonlinear Systems. Michigan State University, East Lansing. 2002. ISBN-13: 978-0130673893.
7. Aizerman, M. A. and Gantmacher, F. R.: Absolute Stability of Regulation Systems. Holden Day, San Francisco (1964).

What is claimed is:

1. A system for navigating to a trajectory starting point by an autonomous robot, the system comprising:
   a GNSS navigation receiver including an antenna or multiple antennas, an analog front end, a plurality of channels, and a processor, all generating navigation and orientation data for the robot;
   based on the navigation and the orientation data, the system calculating a position and a direction of movement for the robot towards the starting point of the trajectory, given known physical constraints for movement of the robot;
   the system calculating spatial and orientation coordinates $z_1$, $z_2$ of the robot, which relate to the position and the direction of movement, where $z_1$ represents lateral deviation, and $z_2$ represents angular deviation;
   the system continuing with a programmed path for the robot for any spatial and orientation coordinates $z_1$, $z_2$ within an attraction domain; and
   for any spatial and orientation coordinates of the robot outside the attraction domain, the system continues maneuvering until the robot is inside the attraction domain.

2. The system of claim 1, wherein a measure V(z) of distance from zero in a $z_1$, $z_2$ plane defined by $$V(z) = z^T P z + \theta \int_0^{c^T z} \Phi(z_2, \sigma) d\sigma,$$

where P is a 2 by 2 matrix
$z^T$ is $(z_1, z_2)^T$, T stands for transposition,
$\theta$ is a scalar coefficient,
$\Phi$ is a control function defined by $$\Phi(z_2, \sigma) = s_{\overline{u}}\left(\frac{\sigma}{(1+z_2^2)^{\frac{3}{2}}}\right)(1+z_2^2)^{\frac{3}{2}},$$

$$s_{\overline{u}}(u) = \begin{cases} -\overline{u} & \text{for } u \le -\overline{u}, \\ u & \text{for } |u| < \overline{u}, \\ \overline{u} & \text{for } u \ge \overline{u}, \end{cases}$$

$$\sigma = \lambda^2 z_1 + 2\lambda z_2,$$

$\lambda$ is a desired rate of exponential decrease of lateral displacement.

3. The system of claim 1, wherein the maneuvering includes course reversal.

4. The system of claim 1, wherein the maneuvering includes a K-turn.

5. The system of claim 1, wherein the maneuvering includes posture stabilization algorithms.

6. The system of claim 1, wherein the maneuvering includes using radar for navigation around the physical constraints.

7. The system of claim 1, wherein the maneuvering includes using lidar for navigation around the physical constraints.

8. The system of claim 1, wherein the spatial and orientation coordinates $z_1$, $z_2$ of the attraction domain are defined by a Lurie-Postnikov function.

9. A method for navigating to a trajectory starting point by an autonomous robot, the method comprising:
   generating navigation and orientation data for the robot using a GNSS navigation receiver that includes an antenna or multiple antennas, an analog front end, a plurality of channels, and a processor;
   based on the navigation and the orientation data, calculating a position and a direction of movement for the robot towards the starting point of the trajectory, given known physical constraints for movement of the robot;
   calculating spatial and orientation coordinates $z_1$, $z_2$ of the robot, which relate to the position and the direction of movement, where $z_1$ represents lateral deviation, and $z_2$ represents angular deviation;

continuing with a programmed path for the robot for any spatial and orientation coordinates $z_1$, $z_2$ within an attraction domain; and for any spatial and orientation coordinates of the robot outside the attraction domain, continuing maneuvering until the robot is inside the attraction domain.

10. The system of claim 9, wherein a measure V(z) of distance from zero in a $z_1$, $z_2$ plane defined by $$V(z) = z^T P z + \theta \int_0^{c^T z} \Phi(z_2, \sigma) d\sigma,$$

where P is a 2 by 2 matrix
$z^T$ is $(z_1, z_2)^T$, T stands for transposition,
$\theta$ is a scalar coefficient,
$\Phi$ is a control function defined by $$\Phi(z_2, \sigma) = s_{\overline{u}}\left(\frac{\sigma}{\left(1+z_2^2\right)^{\frac{3}{2}}}\right)(1+z_2^2)^{\frac{3}{2}},$$

$$s_{\overline{u}}(u) = \begin{cases} -\overline{u} & \text{for } u \le -\overline{u}, \\ u & \text{for } |u| < \overline{u}, \\ \overline{u} & \text{for } u \ge \overline{u}, \end{cases}$$

$$\sigma = \lambda^2 z_1 + 2\lambda z_2,$$

$\lambda$ is a desired rate of exponential decrease of lateral displacement.

11. The method of claim 9, wherein the maneuvering includes course reversal.

12. The method of claim 9, wherein the maneuvering includes a K-turn.

13. The method of claim 9, wherein the maneuvering includes posture stabilization algorithms.

14. The method of claim 9, wherein the maneuvering includes using radar for navigation around the physical constraints.

15. The method of claim 9, wherein the maneuvering includes using lidar for navigation around the physical constraints.

16. The method of claim 9, wherein the spatial and orientation coordinates $z_1$, $z_2$ of the attraction domain are defined by a Lurie-Postnikov function.

* * * * *